United States Patent
Su et al.

(10) Patent No.: US 11,706,016 B2
(45) Date of Patent: Jul. 18, 2023

(54) METHOD OF CONSTRUCTING A PUBLIC-KEY SYSTEM IN QAP-BASED HOMOMORPHIC ENCRYPTION

(71) Applicant: National Applied Research Laboratories, Hsinchu (TW)

(72) Inventors: Zheng-Yao Su, Hsinchu (TW); Ming-Chung Tsai, Hsinchu (TW)

(73) Assignee: NATIONAL APPLIED RESEARCH LABORATORIES, Hsinchu (TW)

( * ) Notice: Subject to any disclaimer, the term of this patent is extended or adjusted under 35 U.S.C. 154(b) by 21 days.

(21) Appl. No.: 17/547,571

(22) Filed: Dec. 10, 2021

(65) Prior Publication Data
US 2023/0131601 A1    Apr. 27, 2023

Related U.S. Application Data

(60) Provisional application No. 63/270,635, filed on Oct. 22, 2021.

(30) Foreign Application Priority Data

Nov. 11, 2021 (TW) ................................ 110142063

(51) Int. Cl.
*H04L 9/08* (2006.01)
*H04L 9/30* (2006.01)
(Continued)

(52) U.S. Cl.
CPC ............ *H04L 9/008* (2013.01); *H04L 9/0852* (2013.01); *H04L 9/14* (2013.01); *H04L 9/3066* (2013.01)

(58) Field of Classification Search
CPC ......... H04L 9/008; H04L 9/0852; H04L 9/14; H04L 9/0366
See application file for complete search history.

(56) References Cited

U.S. PATENT DOCUMENTS

| 2011/0142242 A1* | 6/2011 | Tanaka | H04L 9/0852 380/282 |
| 2021/0058244 A1* | 2/2021 | Jacak | H04L 9/0852 |
| 2022/0231844 A1* | 7/2022 | Berend | H04L 9/0838 |

OTHER PUBLICATIONS

Applications of single-qubit rotations in quantum public-key cryptography, by Nikolopoulos, published 2008 (Year: 2008).*

(Continued)

*Primary Examiner* — Vu V Tran
(74) *Attorney, Agent, or Firm* — Amin, Turocy & Watson, LLP

(57) ABSTRACT

A public-key scheme of Homomorphic Encryption (HE) in the framework Quotient Algebra Partition (QAP) comprises: encryption, computation and decryption. With the data receiver choosing a partition or a QAP, [n, k, C], a public key $Key_{pub}=(VQ_{en}, Gen_{\bar{\epsilon}})$ and a private key $Key_{priv}=\mathcal{A}^{\dagger}P^{\dagger}$ are produced, where $VQ_{en}$ is the product of an n-qubit permutation V and an n-qubit encoding operator $Q_{en}$, $Gen_{\bar{\epsilon}}$ an error generator randomly provides a dressed operator $\bar{E}=V^{\dagger}EV$ spinor error E of [n, k, C]. Then, by $Key_{pub}$, the sender can encode his k-qubit plaintext Ix) into an n-qubit ciphertext $|\psi_{en}\rangle$, which is transmitted to the cloud. The receiver prepares the instruction of encoded computation $U_{en}= P\mathcal{A}\mathcal{M}\mathcal{B}V^{\dagger}Q_{en}^{\dagger}$ for a given k-qubit action M and sends to cloud, where $\mathcal{B}$ is the error-correction operator of [n, k, C], $\mathcal{M}=I_{2^{n-k}}\otimes M$ the tensor product of the (n-k)-qubit identity $I_{2^{n-k}}$ and M , and $V^{\dagger}Q^{\dagger}_{en}$ and $P\mathcal{A}$ the complex-transposes of $VQ_{en}$ and $)^{\dagger}P^{\dagger}$ respectively. The cloud executes the homomorphic encryption computation $U_{en}|\psi_{en}\rangle$ and conveys the encrypted result to receiver. The receiver performs the decryption $Key_{priv}U_{en}|\psi_{en}\rangle$ and obtains the final result Mlx) .

1 Claim, 3 Drawing Sheets

(51) Int. Cl.
*H04L 9/00* (2022.01)
*H04L 9/14* (2006.01)

(56) References Cited

OTHER PUBLICATIONS

Key Generation: Foundations and a New Quantum Approach, by Yuen, published Dec. 2009 (Year: 2009).*

* cited by examiner

METHOD OF CONSTRUCTING A PUBLIC-KEY SYSTEM IN QAP-BASED HOMOMORPHIC ENCRYPTION

RELATED APPLICATIONS

The present application claims the priority of U.S. Provisional Patent Application No. 63/270,635, the disclosure of which is hereby incorporated by reference herein in its entirety.

BACKGROUND OF THE INVENTION

1. Field of the Invention

The present disclosure generally relates to a method for constructing a public key system, particularly, to a method of constructing a public key system in quotient algebra partition (QAP)-based homomorphic encryption (HE).

2. Description of the Related Art

Due to the advancement of science and technology and the development of the industry, especially, the advent of the digital age, any plaintext on the internet is desired to be transferred as a completely encrypted message, to be decrypted securely all the time, and moreover to be proceed in an encrypted state. However, current schemes of homomorphic encryption (HE) are built on the so-called lattice-based cryptography, a class of post-quantum cryptosystems allowing to prevent data from attacks of quantum algorithms. A proportion of noises would occur in every step of encrypted computation. It is required to reduce the effect of the noise to avoid computational errors. In other words, the computation process leads to approximated solutions as an approximation and an exponential overhead of computation is needed to reduce noises during the process. The current achievement of homomorphic encryption are quite limited and the algorithms and the operators computed in the homomorphic encryption would be revealed during the homomorphic encryption. It is a research direction for researchers that how to provide exact solutions instead of approximated ones, conduct blind evaluations without secret disclosures, and allowing problem-dependent optimizations with modest overheads.

Accordingly, inventors of the present inventive concept conduct a deep discussion on the aforementioned requirement based on his research experiments in the related fields and seek for a solutions actively. After a long time research and multiple tests, the inventor finally accomplishes the present invention without shortcomings of the prior art and improve the progressively and practicality.

SUMMARY OF THE INVENTION

In light of solving the foregoing problems of the prior art, the present inventive concept provides a method of constructing a public key system in quotient algebra partition (QAP)-based homomorphic encryption (HE). The schemes of homomorphic encryption are constructed and computed in the framework QAP. After a quantum code is chosen, a plaintext would be encoded as a ciphertext characterized by a string of longer length with a random add-in correctable error; an arithmetic operation acting on the ciphertext would be encoded as an encoded operator acts on the ciphertext. Furthermore, the method would conduct blind evaluations without secret disclosures, and provide exact solutions instead of approximated ones with modest overheads.

The present inventive concept further provides a method of constructing a public key system in QAP-based homomorphic encryption. It allows provide an exact solutions rather than approximated ones due to applications of delicately-designed invertible gates, such as spinor, SWAP, CNOT, Toffoli gate, Controlled SWAP, Multi-Controlled Gate, in Hilbert space to conduct computations.

The present inventive concept further provides a method of constructing a public key system in QAP-based homomorphic encryption. It conducts encoded arithmetic operation and the operators are arranged to attain the design of one-way function as fully blind operators which are characterized by operators acting on the ciphertext.

The present inventive concept further provides a method of constructing a public key system in QAP-based homomorphic encryption which is enable to allow problem-dependent optimizations with modest overheads.

The method of the present inventive concept comprises:

S1. encryption: a quantum code [n, k, C], which is structurally a QAP and wherein n>k, is chosen by a data receiver at first;

S11. key generation: the data receiver generates a public key, $Key_{pub}$, to encrypt data and a private key, $Key_{priv}$, to decrypt data;

In an embodiment of the present inventive concept, the public key is represented by $Key_{pub}=(VQ_{en}, Gen_{\bar{\varepsilon}})$, where $Q_{en}$ is an n-qubit encoding in [n, k, C], V is an n-qubit permutation, $Gen_{\bar{\varepsilon}}$ is an error generator allowing to randomly provide an error from a modified error set $\bar{\varepsilon}$ composed of a gigantic number of dressed operators $\bar{E}=VEV^{\dagger}$ of errors E in [n, k, C]; and wherein the private key for decryption is represented by $Key_{priv}=\mathcal{A}^{\dagger}P^{\dagger}$, which is a product of two n-qubit operators, $\mathcal{A}^{\dagger}$ and $P^{\dagger}$; wherein the public key of encryption, $Key_{pub}$, is published in public space to transform a plaintext to a ciphertext by anyone; and the private key, $Key_{priv}$, is retained by the data receiver to decrypt the ciphertext.

The method of the present inventive concept further comprises:

S12. encoding: data provider provides k-qubit plaintext, $|x\rangle$, preparing a blank state $|0\rangle$ and $|x\rangle$ to cast into a product state $|0\rangle \otimes |x\rangle$ of n qubits; an error generator $Gen_{\bar{\varepsilon}}$ of $Key_{pub}$ randomly generates an error $\bar{E}$ from $\bar{\varepsilon}$; the data provider encodes the product state $|0\rangle \otimes |x\rangle$ into the n-qubit encoded state $|\psi_{en}\rangle = \bar{E}VQ_{en}|0\rangle \otimes |x\rangle$, which means when the data provider encrypts a k-qubit basis state sensitive data (which is plaintext), $|x\rangle$, by writing the product state $|0\rangle \otimes |x\rangle$ of n qubits (which is plaintext) from the plaintext $|x\rangle$ for the basis state $|0\rangle$ of n–k qubits; by a modified encoding $VQ_{en}$ provided by the public key $Key_{pub}$ and a modified error $\bar{E}$ generated randomly from $Gen_{\bar{\varepsilon}}$ of $Key_{pub}$, acquiring a encoded state ciphertext $|\psi_{en}\rangle$ by $\psi_{en}\rangle = \bar{E}VQ_{en}|0\rangle \otimes |x\rangle$; and the data provider sends $|\psi_{en}\rangle$ to a computation provider.

The method of the present inventive concept further comprises:

S2. Computation:

S21. a k-qubit arithmetic operation M is given to be operated on the encrypted state $|\psi_{en}\rangle$; the k-qubit arithmetic operation M is written as n-qubit operation $\mathcal{M} = I_{2^{n-k}} \otimes M$, which is a tensor product of an (n–k)-qubit operation of identity operator $I_{2^{n-k}}$ and a k-qubit operation M; the data receiver produces a computational instructions of a homomorphic encryption (HE) operation $U_{en}$ with a form:

$U_{en} = P\mathcal{A}\mathcal{M}\mathcal{B}Q^{\dagger}_{en}V^{\dagger} = (PW_1P_1)(P^{\dagger}_2W^{\dagger}_1\mathcal{A}\mathcal{M}$
$\mathcal{B}_1W_1P_1)(P^{\dagger}_1P_0)(P^{\dagger}_0W^{\dagger}_1\mathcal{B}_2W_1P_0)(P^{\dagger}_0W_2)$, where $Q^{\dagger}_{en}V^{\dagger}=W_1W_2$ with a qubit permutation $W_1$ and an operator $W_2$ comprising Spinor, CNOTs, Toffolis, SWAPs, Controlled SWAPs, Multi-Control Gate, $P_{J=0,1}$ and P are qubit permutations following $PW_1P_1=I_{2^n}$, and the correction operation $\mathcal{B}=\mathcal{B}_1\mathcal{B}_2$ is written as a product of two operators $\mathcal{B}_1$ and $\mathcal{B}_2$, which are consisting of Spinor, CNOTs, Toffolis, SWAPs, Controlled SWAPs, Multi-Controlled Gate;

the data provider sends the encoded computational instructions $U_{en}$ to the computation provider and the computation provider receives the computational instructions to computes $U_{en}|\psi_{en}\rangle$.

The method of the present inventive concept further comprises:

S3. Decryption: the computation provider conducts homomorphic encryption computation $U_{en}|\psi_{en}\rangle$ and sends the encrypted results to the data receiver; the data receiver decrypts the results by applying the private key $Key_{priv}=\mathcal{A}^{\dagger}P^{\dagger}$ to the state $U_{en}|\psi_{en}\rangle$, which is written as $$\mathcal{A}^{\dagger}P^{\dagger}U_{en}|\psi_{en}\rangle=|\lambda\rangle\otimes M|x\rangle;$$

with an (n−k)-qubit syndrome state $|\lambda\rangle$, and then obtains the result $M|x\rangle$.

DETAILED DESCRIPTION

The present inventive concept is described by the following specific embodiments. Those with ordinary skills in the arts can readily understand other advantages and functions of the present inventive concept after reading the disclosure of this specification. Any changes or adjustments made to their relative relationships, without modifying the substantial technical contents, are also to be construed as within the range implementable by the present inventive concept.

Moreover, the word "exemplary" or "embodiment" is used herein to mean serving as an example, instance, or illustration. Any aspect or design described herein as exemplary or an embodiment is not necessarily to be construed as preferred or advantageous over other aspects or designs. Rather, use of the word "exemplary" or "embodiment" is intended to present concepts and techniques in a concrete fashion.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Figure 1:
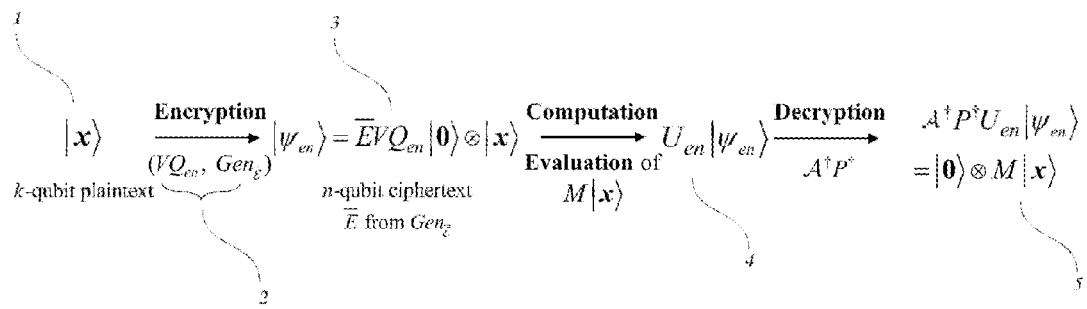
FIG. 1 is a schematic flow diagrams according to the present inventive concept.

Please refer to FIG. 1 first. The present inventive concept provides a method of constructing a public key system in QAP-based homomorphic encryption. by an algebraic structure, QAP, and an arithmetic operation of homomorphic encryption. The Encryption, computation and decryption are computed after the schemes of homomorphic encryption are constructed and computed in the framework of QAP by QAP-based fault tolerance quantum computation in an algebraic structure of QAP. In the computation, a k-qubit state, i.e. $|x\rangle$ (1), in a quantum computation could be provided, which is represented as a k-qubit binary string in this code system and as a plaintext. This plaintext is represent as an element in an additive group $Z^k_2$, and considered as a vector having $2^k$ dimensions. For example, k=3 qubit, the plaintext $|x\rangle=|100\rangle$ is an element in the additive group $Z^3_2=\{000, 001, 010, 011, 100, 101, 110, 111\}$, which is considered to be a vector having $2^3$ dimensions.

According to the present inventive concept, the encryption in the method to obtain a ciphertext, i.e. $|\psi_{en}\rangle$, with longer codes comprises the steps of key generation and encoding. In the step of key generation, a public key, $Key_{pub}$, to encrypt data and a private key, $Key_{priv}$, to decrypt data would be generated. In this code system, the public key may be represented by $Key_{pub}=(VQ_{en}, Gen_{\bar{E}})$, which is k-qubit state. Wherein $|x\rangle$ (1), which is a plaintext may be transform into a ciphertext, $|\psi_{en}\rangle$, by the public key for encryption, where $Q_{en}$ is an n-qubit encoding in [n, k, C], V is an n-qubit permutation, each of which may be represented as a $2^n\times2^n$ matrix or composed by elementary gates (please further refer to FIG. 3). $Gen_{\bar{E}}$ is an error generator allowing to randomly provide an error from a modified error set $\bar{E}$ composed of a gigantic number of dressed operators $\bar{E}=VEV^{\dagger}$ of errors E in [n, k, C]; the error is a spinor, which may be represented as a $2^n\times2^n$ matrix or composed by elementary gates.

When the encoded state $|\psi_{en}\rangle=|0\rangle\otimes|x\rangle$ (3) may be obtained in the encryption, the vector $|\psi_{en}\rangle$ means a encoded state, namely a ciphertext, and $\bar{E}VQ_{en}$ is a product by three operations. An n-qubit string $|0\rangle\otimes|x\rangle$ is a tensor product of an (n−k)-qubit basic state and a k-qubit basic state $|x\rangle$. For example, n=5, k=3, $|x\rangle=|111\rangle$, $|0\rangle\otimes|x\rangle=|00\rangle\otimes|111\rangle=|00111\rangle$.

In the step of computation, a k-qubit computation $M|x\rangle$ is realized by an equivalent homomorphic encryption computation, that is, an encoded operation $U_{en}$ on the encrypted state of $|\psi_{en}\rangle$. Because $U_{en}$ is an operation of homomorphic encryption, which is an encoding of the k-qubit operation M (represented as a $2^k\times2^k$ matrix or composed of elementary gates), which may be represented as a $2^n\times2^n$ matrix or composed of elementary gates; $U_{en}|\psi_{en}\rangle$ means the operation $U_{en}$ is conducted on the ciphertext $|\psi_{en}\rangle$, which results an n-qubit state and achieves $U_{en}|\psi_{en}\rangle$ (4).

Finally, in the step of decryption, $U_{en}|\psi_{en}\rangle$ (4) is decrypted. The decryption is conducted by the $Key_{priv}=\mathcal{A}^{\dagger}P^{\dagger}$ which is generated by the step of the key generation at the beginning, which is written as $\mathcal{A}^{\dagger}P^{\dagger}U_{en}|\psi_{en}\rangle=|\lambda\rangle\otimes M|x\rangle$ (5), with an (n−k)-qubit syndrome state $|\lambda\rangle$, and then obtains the result $M|x\rangle$. Wherein $\mathcal{A}^{\dagger}P^{\dagger}$ represents the private key of the code system, which is a product of the operations alt and Pt (each of the two operations may be represented as a $2^n\times2^n$ matrix or composed of elementary gates, respectively), $|\lambda\rangle$ is an (n−k)-qubit string and $M|x\rangle$ is a k-qubit string (which is an original computation without encryption).

Figure 2:
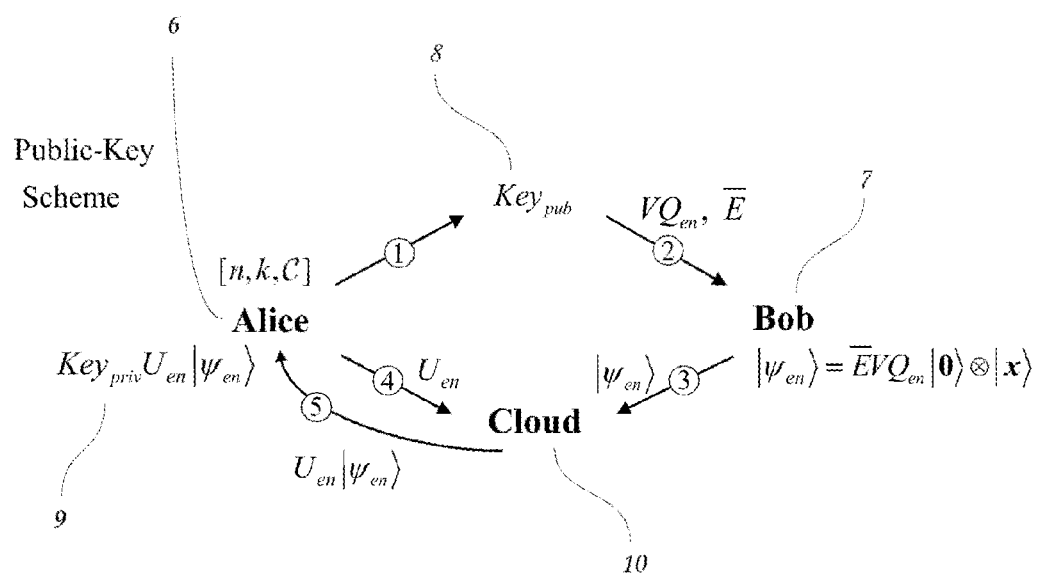
FIG. 2 is a flow chart of actual operation for encryption, computation and decryption according to the present inventive concept.

Please refer to FIG. 2 which is a flow chart of actual operation for encryption, computation and decryption according to the present inventive concept. According to an embodiment of the present inventive concept, the steps of the method may be as follows. Step S1. Encryption. a quantum code [n, k, C], which is structurally a QAP and wherein n>k, is chosen by a data receiver (Alice) (6) at first. The step of encryption may include key generation and encoding. Step S11. key generation. Alice generates a public key, $Key_{pub}$, to encrypt data (8) (please refer to ① in FIG. 2) and a private key, $Key_{priv}$, to decrypt data (9). wherein the public key (8) provides a modified encoding $VQ_{en}$ and a modified error $\bar{E}$ randomly generated, which may be represent by $Key_{pub}=(VQ_{en}, Gen_{\bar{\varepsilon}})$ and sent to a data provider (Bob) (7) (please refer to ② in FIG. 2), where $Q_{en}$ is an n-qubit encoding in [n, k, C], V is an n-qubit permutation, $Gen_{\bar{\varepsilon}}$ is an error generator allowing the public key to randomly provide an error from a modified error set $\bar{E}$ composed of a gigantic number of dressed operators $\bar{E}=VEV^\dagger$ of errors E in [n, k, C]. The private key $Key_{priv}$ (9) used for decryption may be represented by $Key_{priv}=\mathcal{A}^\dagger P^\dagger$, which is a product of two n-qubit operators, $\mathcal{A}^\dagger$ and $P^\dagger$; wherein the public key of encryption, $Key_{pub}$ (8), may be published in public space to transform a plaintext to a ciphertext by anyone; and the private key, $Key_{priv}$ (9), is retained by Alice to decrypt the encrypted ciphertext. In the step S12 encoding: Bob provides k-qubit plaintext, $|x\rangle$, to conduct a computation of homomorphic encryption. A blank state $|0\rangle$ and $|x\rangle$ are prepared to cast into a product state $|0\rangle \otimes |x\rangle$ of n qubits; an error generator $Gen_{\bar{\varepsilon}}$ of $Key_{pub}$ randomly generates an error $\bar{E}$ from $\bar{\varepsilon}$; Bob (7) encodes the product state $|0\rangle \otimes |x\rangle$ into the n-qubit encoded state $|\psi_{en}\rangle = \bar{E}VQ_{en}|0\rangle \otimes |x\rangle$, which means when Bob encrypts a k-qubit basis state sensitive data (which is plaintext), $|x\rangle$, by writing the product state $|0\rangle \otimes |x\rangle$ of n qubits (which is plaintext) from the plaintext $|x\rangle$ for the basis state $|0\rangle$ of n−k qubits; by a modified encoding $VQ_{en}$ provided by the public key $Key_{pub}$ and a modified error $\bar{E}$ generated randomly from $Gen_{\bar{\varepsilon}}$ of $Key_{pub}$, acquiring a encoded state ciphertext $|\psi_{en}\rangle$ by $|\psi_{en}\rangle = \bar{E}VQ_{en}|0\rangle$; and Bob (7) sends the ciphertext $|\psi_{en}\rangle$ to a computation provider (cloud) (please refer to ③ in FIG. 2).

According to an embodiment of the present inventive concept, the method may comprise Step S2. Computation. A k-qubit arithmetic operation, M, is given to be operated on the encrypted state $|\psi_{en}\rangle$; the k-qubit arithmetic operation M is written as n-qubit operation $\mathcal{M} = I_{2^{n-k}} \otimes M$, which is a tensor product of an (n−k)-qubit operation of identity $I_{2^{n-k}}$ and a k-qubit operation M; Alice (6) may produce a computational instructions of a homomorphic encryption (HE) operation $U_{en}$ with a form:

$$U_{en}=P\mathcal{A}\mathcal{M}\mathcal{B}Q^\dagger_{en}V^\dagger=(PW_1P_1)(P^\dagger_1W^\dagger_1\mathcal{A}\mathcal{M}\mathcal{B}_1W_1P_1)(P^\dagger_1P_0)(P^\dagger_0W^\dagger_1\mathcal{B}_2W_1P_0)(P^\dagger_0W_2),$$

where $Q^\dagger_{en}V^\dagger=W_1W_2$ with a qubit permutation $W_1$ and an operator $W_2$ comprising elementary gates, such as Spinor, CNOTs, Toffolis, SWAPs, Controlled SWAPs, Multi-Control Gate. $P_{J=0,1}$ and P are qubit permutations following $PW_1P_1=I_{2^n}$, and the correction operation $\mathcal{B}=\mathcal{B}_1\mathcal{B}_2$ is written as a product of two operators, $\mathcal{B}_1$ and $\mathcal{B}_2$, each of which are consisting of elementary gates, such as Spinor, CNOTs, Toffolis, SWAPs, Controlled SWAPs, Multi-Control Gate.

Then, Alice sends the encoded computational instructions $U_{en}$ to cloud (10) (please refer to ④ in FIG. 2) and cloud (10) receives the computational instructions to computes $U_{en}|\psi_{en}\rangle$.

According to an embodiment of the present inventive concept, the method may comprise Step S3. Decryption. Cloud conducts homomorphic encryption computation $U_{en}|\psi_{en}\rangle$ and sends the encrypted results to Alice (6) (please refer to ⑤ in FIG. 2); Alice (6) may decrypt the encrypted results by applying the private key $Key_{priv}=\mathcal{A}^\dagger P^\dagger$ to the state $U_{en}|\psi_{en}\rangle$, which is written as $$\mathcal{A}^\dagger P^\dagger U_{en}|\psi_{en}\rangle = |\lambda\rangle \otimes M|x\rangle;$$

with an (n−k)-qubit syndrome state $|\lambda\rangle$, and then obtains the result $M|x\rangle$.

Figure 3:
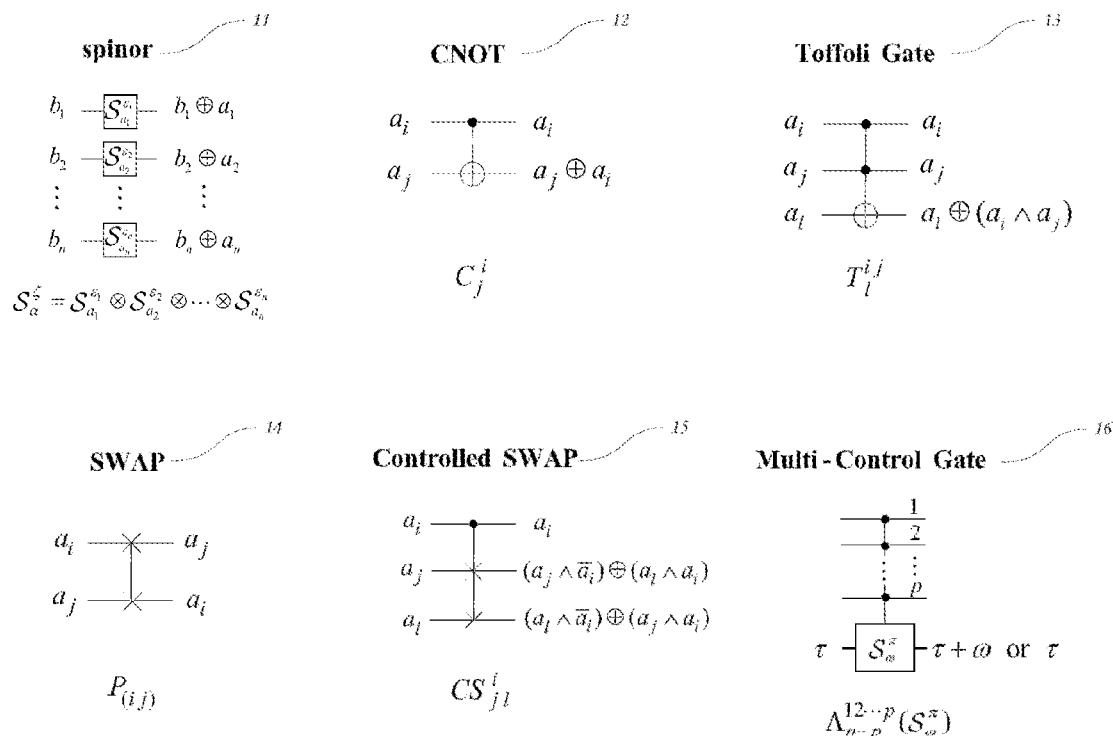
FIG. 3 is a schematic diagram of the elementary gate used in the algorithm according to the present inventive concept.

Please refer to FIG. 3 which is a schematic diagram of the elementary gate used in the algorithm according to the present inventive concept. According to the present inventive concept, the spinor (11) is an n-qubit spinor $\mathcal{S}^\zeta_a = \mathcal{S}^{\varepsilon_1}_{a_1} \otimes \mathcal{S}^{\varepsilon_2}_{a_2} \otimes \ldots \otimes \mathcal{S}^{\varepsilon_n}_{a_n}$, composed of a tensor product of n spinors, with $\zeta$, $a \in Z^n_2$ and $\varepsilon_j$, $a_j \in Z_2$. Each of the spinors $\mathcal{S}^{\varepsilon_j}_{a_j}$, $1 \le j \le n$, may be represented as a 2×2 matrix. The spinor $\mathcal{S}^{\varepsilon_j}_{a_j}$ may transform a single-bit string $b_j$ into $b_j \oplus a_j$, where $\oplus$ means a logical XOR operation, i.e. $0\oplus 0=0=1\oplus 1$, $0\oplus 1=1=1\oplus 0$.

According to the present inventive concept, CNOT (12) is a binary logic gate operation. A binary string, $a_i a_j$, is given, where $a_i$ is a control bit and $a_j$ is a target bit. $a_i$ remain the same and $a_j$ is transformed into $a_j \oplus a_i$ for the CNOT operation performing on $a_i a_j$.

According to the present inventive concept, Toffoli gate (13) is a trinary logic gate operation. A trinary string, $a_i a_j a_l$, is given, where $a_i$ and $a_j$ are control bits and $a_l$ is a target bit. $a_i$ and $a_j$ remain the same and $a_l$ is transformed into $=a_l \oplus (a_i \wedge a_j)$ for the Toffoli gate operation performing on $a_i a_j a_l$, where $\wedge$ means a logical AND operation.

According to the present inventive concept, SWAP (14) is a binary logic gate operation. A binary string, $a_i a_j$, is given. The SWAP gate swaps the qubits, $a_i$ and $a_j$, to generate a string $a_j a_i$.

According to the present inventive concept, CSWAP (Controlled SWAP) ((15) is a trinary logic gate operation. A trinary string, $a_i a_j a_l$ is given, where $a_i$ is a control bit and $a_j$ and $a_l$ is target bits. $a_i$ remains the same and $a_j$ is transformed into $(a_j \wedge \bar{a}_i) \oplus (a_l \wedge a_i)$, $a_l$ is transformed into $(a_l \wedge \bar{a}_i) \oplus (a_i \wedge a_j)$ for the CSWAP operation on $a_i a_j a_l$, where $\bar{a}_i$ is a negation of the original bit $a_i$, e.g. $\bar{0}=1$, $\bar{1}=0$.

According to the present inventive concept, Multi-Control gate (16) is a n-nary logical gate operation. A n-bit string, $a_1 a_2 \ldots a_p a_{p+1} \ldots a_n$, is given. Performing a multi-control p-gate $\wedge^{12 \ldots p} P_{n-p}(\mathcal{S}^\pi_{107})$, if the first p-bit $a_1=a_2= \ldots = a_p=1$, the last (n−p)-bits are effected by the spinor $\mathcal{S}^\pi_\omega$; otherwise the n-bit string remains the same.

In summary, the method of constructing a public key system in QAP-based homomorphic encryption of the present inventive concept allows so-called Homomorphic Encryption to be conducted without communication between the data receiver and the data provider during encryption. The method of the present inventive concept may conduct blind evaluations without secret disclosures, and allow problem-dependent optimizations with modest overheads.

The foregoing descriptions of the detailed embodiments are only illustrated to disclose the features and functions of the present inventive concept and not restrictive of the scope of the present inventive concept. It should be understood to those in the art that all modifications and variations according to the spirit and principle in the disclosure of the present inventive concept should fall within the scope of the appended claims.

What is claimed is:

1. A method of constructing a public key system in Quotient Algebra Partition (QAP)-based homomorphic encryption (HE), by an algebraic structure, QAP, and an arithmetic operation of homomorphic encryption, wherein the method comprises:
   S1: encryption: a quantum code [n, k, C], which is structurally a QAP and wherein n>k, is chosen by a data receiver at first;

S11: key generation: the data receiver generates a public key, $\text{Key}_{pub}$, to encrypt data and a private key, $\text{Key}_{priv}$, to decrypt data;

wherein the public key is represented by $$\text{Key}_{pub} = (VQ_{en}, \text{Gen}_{\bar{\varepsilon}}),$$

where $Q_{en}$ is an n-qubit encoding in [n, k, C], V is an n-qubit permutation, $\text{Gen}_{\bar{\varepsilon}}$ is an error generator allowing to randomly provide an error from a modified error set $\bar{\varepsilon}$ composed of a gigantic number of dressed operators $\bar{E} = VEV^\dagger$ of errors E in [n, k, C]; and wherein the private key for decryption is represented by $\text{Key}_{priv} = \mathcal{A}^\dagger P^\dagger$, which is a product of two n-qubit operators, $\mathcal{A}^\dagger$ and $P^\dagger$; wherein the public key of encryption, $\text{Key}_{pub}$, is published in public space to transform a plaintext to a ciphertext by anyone; and the private key, $\text{Key}_{priv}$, is retained by the data receiver to decrypt the encrypted ciphertext;

S12: encoding: a data provider provides k-qubit plaintext, $|x\rangle$, preparing a blank state $|0\rangle$ and $|x\rangle$ to cast into a product state $|0\rangle \otimes |x\rangle$ of n qubits; an error generator $\text{Gen}_{\bar{\varepsilon}}$ of $\text{Key}_{pub}$ randomly generates an error $\bar{E}$ from $\bar{\varepsilon}$; the data provider encodes the product state $|0\rangle \otimes |x\rangle$ into the n-qubit encoded state $|\psi_{en}\rangle = \bar{E}VQ_{en}|0\rangle \otimes |x\rangle$, which means when the data provider encrypts a k-qubit basis state sensitive data (which is plaintext), $|x\rangle$, by writing the product state $|0\rangle \otimes |x\rangle$ of n qubits (which is plaintext) from the plaintext $|x\rangle$ for the basis state $|0\rangle$ of n−k qubits;

by a modified encoding $VQ_{en}$ provided by the public key $\text{Key}_{pub}$ and a modified error $\bar{E}$ generated randomly from $\text{Gen}_{\bar{\varepsilon}}$ of $\text{Key}_{pub}$, acquiring a encoded state ciphertext $|\psi_{en}\rangle$ by $|\psi_{en}\rangle = \bar{E}VQ_{en}|0\rangle \otimes |x\rangle$; and the data provider sends $|\psi_{en}\rangle$ to a computation provider;

S2: Computation:

S21: a k-qubit arithmetic operation M is given to be operated on the encrypted state $|_{en}\rangle$; the k-qubit arithmetic operation M is written as n-qubit operation $\mathcal{M} = I_{2^{n-k}} \otimes M$, which is a tensor product of an (n−k)-qubit operation of identity operator $I_{2^{n-k}}$ and a k-qubit operation M; the data receiver produces a computational instructions of a homomorphic encryption (HE) operation $U_{en}$ with a form:

$$U_{en} P \mathcal{A} \mathcal{M} \mathcal{B} Q^\dagger_{en} V^\dagger = (PW_1 P_1)(P^\dagger_1 W^\dagger_1 \mathcal{A} \mathcal{M} \mathcal{B}_1 W_1 P_1)(P^\dagger_1 P_0)(P^\dagger_0 W^\dagger_1 \mathcal{B}_2 W_1 P_0)(P^\dagger_0 W_2),$$

where $Q^\dagger_{en} V^\dagger = W_1 W_2$ with a qubit permutation $W_1$ and an operator $W_2$ comprising Spinor, CNOTs, Toffolis, SWAPs, Controlled SWAPs, Multi-Control Gate, $P_{j=0,1}$ and P are qubit permutations following the nilpotent condition $PW_1 P_1 = I_{2^n}$, and the correction operation $\mathcal{B} = \mathcal{B}_1 \mathcal{B}_2$ is written as a product of two operators $\mathcal{B}_1$ and $\mathcal{B}_2$, which are consisting of Spinor, CNOTs, Toffolis, SWAPs, Controlled SWAPs, Multi-Controlled Gate;

the data provider sends the encoded computational instructions $U_{en}$ to the computation provider and the computation provider receives the computational instructions to computes $U_{en}|\psi_{en}\rangle$;

S3: Decryption:

the computation provider conducts homomorphic encryption computation $U_{en}|\psi_{en}\rangle$ and sends the encrypted results to the data receiver; the data receiver decrypts the results by applying the private key $\text{Key}_{priv} = \mathcal{A}^\dagger P^\dagger$ to the state $U_{en}|\psi_{en}\rangle$, which is written as $$\mathcal{A}^\dagger P^\dagger U_{en}|\psi_{en}\rangle = |\lambda\rangle \otimes M|x\rangle;$$

with an (n−k)-qubit syndrome state $|\lambda\rangle$, and then obtains the result $M|x\rangle$.

* * * * *

UNITED STATES PATENT AND TRADEMARK OFFICE
CERTIFICATE OF CORRECTION

| | | |
|---|---|---|
| PATENT NO. | : 11,706,016 B2 | Page 1 of 1 |
| APPLICATION NO. | : 17/547571 | |
| DATED | : July 18, 2023 | |
| INVENTOR(S) | : Su et al. | |

It is certified that error appears in the above-identified patent and that said Letters Patent is hereby corrected as shown below:

In the Claims

Claim 1 reads "the data provider" - in Column 8, Line 21:
It should read ..."the data receiver..."

Signed and Sealed this
Sixth Day of August, 2024

Katherine Kelly Vidal
*Director of the United States Patent and Trademark Office*